(12) United States Patent
Brewer et al.

(10) Patent No.: US 10,605,609 B2
(45) Date of Patent: Mar. 31, 2020

(54) COUPLED INTERACTIVE DEVICES

(71) Applicant: Microsoft Technology Licensing, LLC, Redmond, WA (US)

(72) Inventors: Brett D. Brewer, Sammamish, WA (US); Jaron Lanier, Berkeley, CA (US); Agustya Mehta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 15/585,391

(22) Filed: May 3, 2017

(65) Prior Publication Data

US 2018/0321042 A1 Nov. 8, 2018

(51) Int. Cl.
*G01C 21/20* (2006.01)
*G08B 7/06* (2006.01)
(Continued)

(52) U.S. Cl.
CPC ........... *G01C 21/206* (2013.01); *G06F 21/32* (2013.01); *G07C 9/00087* (2013.01);
(Continued)

(58) Field of Classification Search
CPC ...... G01C 21/206; H04W 4/029; H04W 4/80; H04W 4/025; H04W 4/024; H04W 4/33;
(Continued)

(56) References Cited

U.S. PATENT DOCUMENTS

| 5,751,221 A | * | 5/1998 | Stanfield | G06F 16/10 340/5.74 |
| 6,249,808 B1 | * | 6/2001 | Seshadri | H04L 29/06 709/203 |

(Continued)

FOREIGN PATENT DOCUMENTS

| EP | 1150217 A2 | * | 10/2001 | ............ G06F 16/10 |
| EP | 2298215 A1 | * | 3/2011 | ............ A61B 90/39 |

(Continued)

OTHER PUBLICATIONS

Riva et al., "Progressive Authentication: Deciding When to Authenticate on Mobile Phones", Proceedings of USENIX Security Symposium, Aug. 8, 2012, 16 pages.

(Continued)

*Primary Examiner* — Tuan C To
(74) *Attorney, Agent, or Firm* — Rainier Patents, P.S.

(57) ABSTRACT

The discussion relates to spatially meshed interactive devices. One example can include a mesh component that has access to a layout of features of a facility and to information about users associated with the facility. The example can also include multiple interactive devices including sensors and communication components. The multiple interactive devices are communicatively coupled via the communication components and at least some of the multiple interactive devices are communicatively coupled to the mesh component. The multiple interactive devices are located at known positions in the facility to create a spatial mesh at the facility relative to the features.

19 Claims, 7 Drawing Sheets

(51) Int. Cl.
*H04W 4/029* (2018.01)
*G07C 9/00* (2020.01)
*H04L 29/06* (2006.01)
*G06F 21/32* (2013.01)
*H04W 4/80* (2018.01)
*H04W 4/02* (2018.01)
*H04W 4/024* (2018.01)
*H04W 4/33* (2018.01)

(52) U.S. Cl.
CPC .......... *G07C 9/00111* (2013.01); *G08B 7/066* (2013.01); *H04L 63/0861* (2013.01); *H04W 4/025* (2013.01); *H04W 4/029* (2018.02); *H04W 4/80* (2018.02); *G06F 2221/2111* (2013.01); *G07C 2209/41* (2013.01); *H04W 4/024* (2018.02); *H04W 4/33* (2018.02)

(58) Field of Classification Search
CPC ............. G06F 21/32; G06F 2221/2111; G07C 9/00087; G07C 9/00111; G07C 2209/41; G08B 7/066; H04L 63/0861
USPC .......................................................... 701/539
See application file for complete search history.

(56) References Cited

U.S. PATENT DOCUMENTS

| | | | |
|---|---|---|---|
| 6,727,818 B1* | 4/2004 | Wildman | G06F 19/3418 340/573.1 |
| 8,140,335 B2 | 3/2012 | Kennewick et al. | |
| 8,358,197 B2* | 1/2013 | Tran | G07C 9/00309 340/5.26 |
| 8,839,358 B2 | 9/2014 | Strauss et al. | |
| 9,031,845 B2 | 5/2015 | Kennewick et al. | |
| 9,204,251 B1* | 12/2015 | Mendelson | G08G 1/14 |
| 9,262,612 B2 | 2/2016 | Cheyer | |
| 9,318,108 B2 | 4/2016 | Gruber et al. | |
| 9,460,350 B2* | 10/2016 | Cook | G06K 9/00771 |
| 9,491,033 B1 | 11/2016 | Soyannwo et al. | |
| 9,666,000 B1* | 5/2017 | Schoenfelder | G07C 9/00111 |
| 10,146,194 B2* | 12/2018 | Todeschini | G05B 15/02 |
| 2002/0095486 A1* | 7/2002 | Bahl | H04L 29/06 709/223 |
| 2003/0149343 A1 | 8/2003 | Siegel et al. | |
| 2005/0089198 A1 | 4/2005 | Ono et al. | |
| 2006/0044158 A1* | 3/2006 | Womble | G01D 4/004 340/870.02 |
| 2008/0249983 A1* | 10/2008 | Meisels | G01C 21/3476 |
| 2009/0274130 A1* | 11/2009 | Boch | H01Q 1/125 370/338 |
| 2012/0330937 A1* | 12/2012 | Frazier | G06F 16/954 707/723 |
| 2014/0044043 A1* | 2/2014 | Moshfeghi | H04B 7/0617 370/328 |
| 2014/0359510 A1* | 12/2014 | Graf | G01C 21/3667 715/771 |
| 2015/0035934 A1* | 2/2015 | Chen | H04M 3/5315 348/14.02 |
| 2015/0211858 A1 | 7/2015 | Jerauld | |
| 2016/0036799 A1* | 2/2016 | Lyman | H04L 63/08 726/7 |
| 2016/0127920 A1* | 5/2016 | Thomas | H04B 7/0617 455/446 |
| 2016/0180663 A1* | 6/2016 | McMahan | G08B 25/08 340/691.6 |
| 2016/0258767 A1 | 9/2016 | Nevrekar et al. | |
| 2016/0262663 A1* | 9/2016 | Maclaren | A61B 5/0555 |
| 2016/0356612 A1 | 12/2016 | Beaurepaire | |
| 2016/0372110 A1 | 12/2016 | Waltermann et al. | |
| 2017/0124836 A1* | 5/2017 | Chung | H04W 4/90 |
| 2017/0171754 A1* | 6/2017 | South | H04W 4/90 |
| 2019/0089831 A1* | 3/2019 | Medlen | H04M 3/4936 |

FOREIGN PATENT DOCUMENTS

| | | |
|---|---|---|
| GB | 2513048 A | 10/2014 |
| WO | 2008/118195 A2 | 10/2008 |
| WO | 2014/200728 A1 | 12/2014 |
| WO | 2016/054230 A1 | 4/2016 |

OTHER PUBLICATIONS

"Cortana and Privacy", retrieved at <<https://privacy.microsoft.com/en-us/windows-10-cortana-and-privacy>> on Jan. 20, 2017, 9 pages.
"International Search Report and Written Opinion Issued in PCT Application No. PCT/US18/028220", dated Sep. 6, 2018, 22 Pages.

* cited by examiner

COUPLED INTERACTIVE DEVICES

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the figure and associated discussion where the reference number is first introduced.

FIGS. 2A-3B show perspective views of portions of the facility in accordance with some implementations of the present concepts.

DETAILED DESCRIPTION

The discussion relates to a spatial mesh of interactive devices. An interactive device can be viewed as a smart device that can interact with a user, such as through audio and/or visual communications. The interactive devices can be positioned in (and/or around) a facility. Individual interactive devices can communicate with, and/or be aware of, other interactive devices at the facility to provide robust functionalities that cannot be achieved by isolated devices.

FIGS. 1-3B collectively show an example spatial mesh of interactive devices and associated features.

Figure 1:
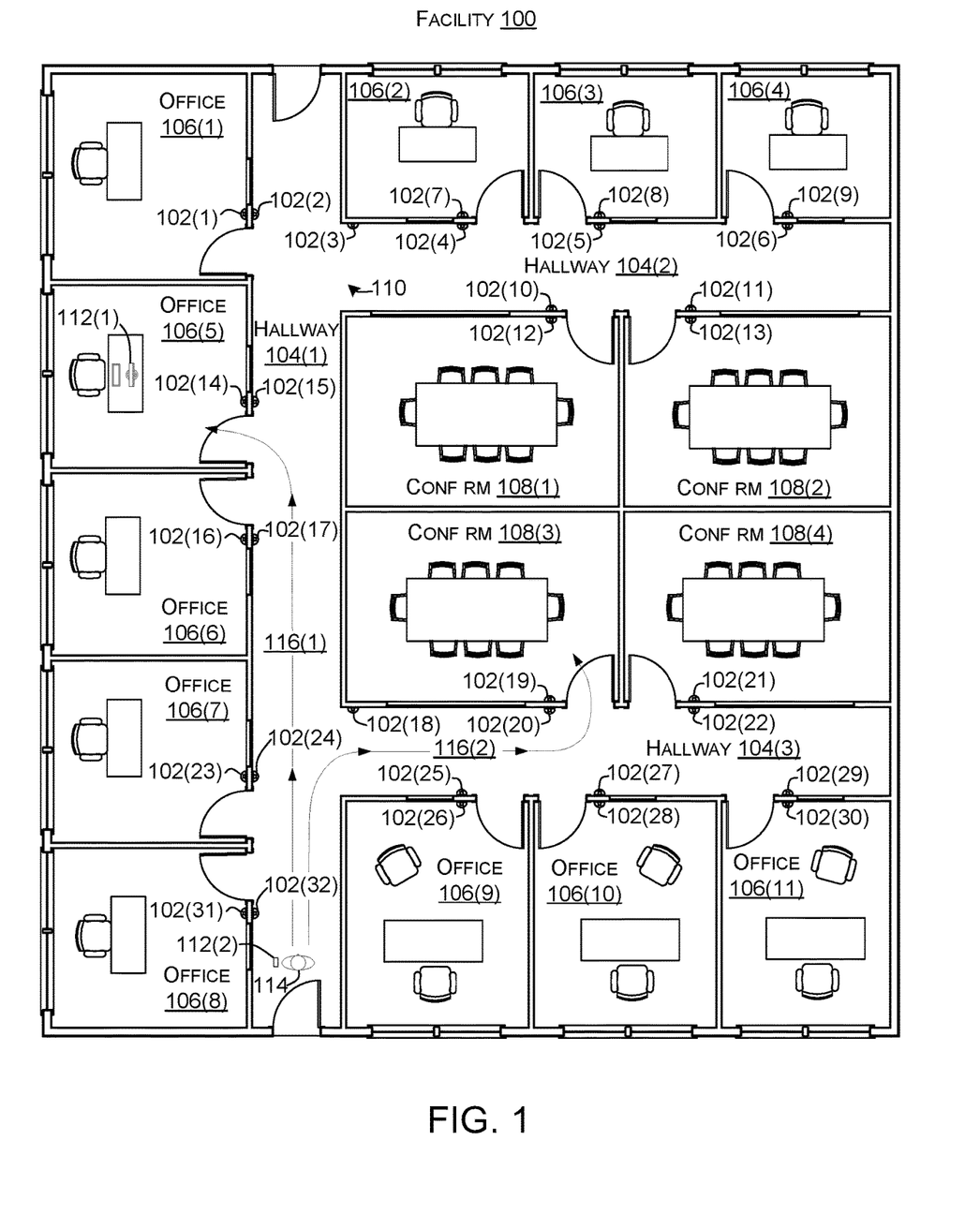
FIG. 1 shows a plan view of a facility and a spatial mesh of interactive devices in accordance with some implementations of the present concepts.

FIG. 1 illustrates an example facility 100 that includes interactive devices 102(1)-102(3 2) positioned relative to the facility. In this case the facility 100 includes hallways 104, offices 106, and conference rooms 108. (Other areas are contemplated in other facility examples). The interactive devices 102 can be arranged in a spatial mesh (e.g., hereinafter, "mesh") 110 relative to the facility 100. In the spatial mesh 110, each interactive device 102 can be communicatively coupled to at least one other interactive device 102. In some configurations, the interactive devices can be stand-alone devices that are readily noticeable in the facility. In other cases, the interactive devices can have a physical appearance of a commonly encountered object in a facility, such as a light fixture, decoration, etc.

Individual interactive devices 102 can also be coupled to other devices 112, such as notebook computer 112(1) and/or smart phone 112(2) carried by user 114(2), among others. The interactive devices 102 can also know their location relative to the facility 100 and/or to some of the other interactive devices 102. For instance, an individual interactive device 102(20) may know that it is in hallway 104(3) outside of conference room 108(3), that it is between interactive devices 102(18) and 102(22) in the hallway, and that interactive device 102(19) is positioned in conference room 108(3). Alternatively or additionally, interactive device 102 (20) may know the global navigation satellite system (GNSS) coordinates of interactive device 102(18) and that it (interactive device 102(20)) is positioned horizontally (e.g., at the same height) 20 feet east of interactive device 102(18), for example. (GNSS is commonly encountered as global positioning system (GPS), but other systems exist and/or are in development).

FIG. 1 also shows example paths 116 that users 114 can take to destinations within the facility 100. Example path 116(1) relates to user 114(1) and is discussed below relative to FIGS. 2A and 2B, and example path 116(2) relates to user 114(2) and is discussed below relative to FIGS. 3A and 3B.

Figure 2A:
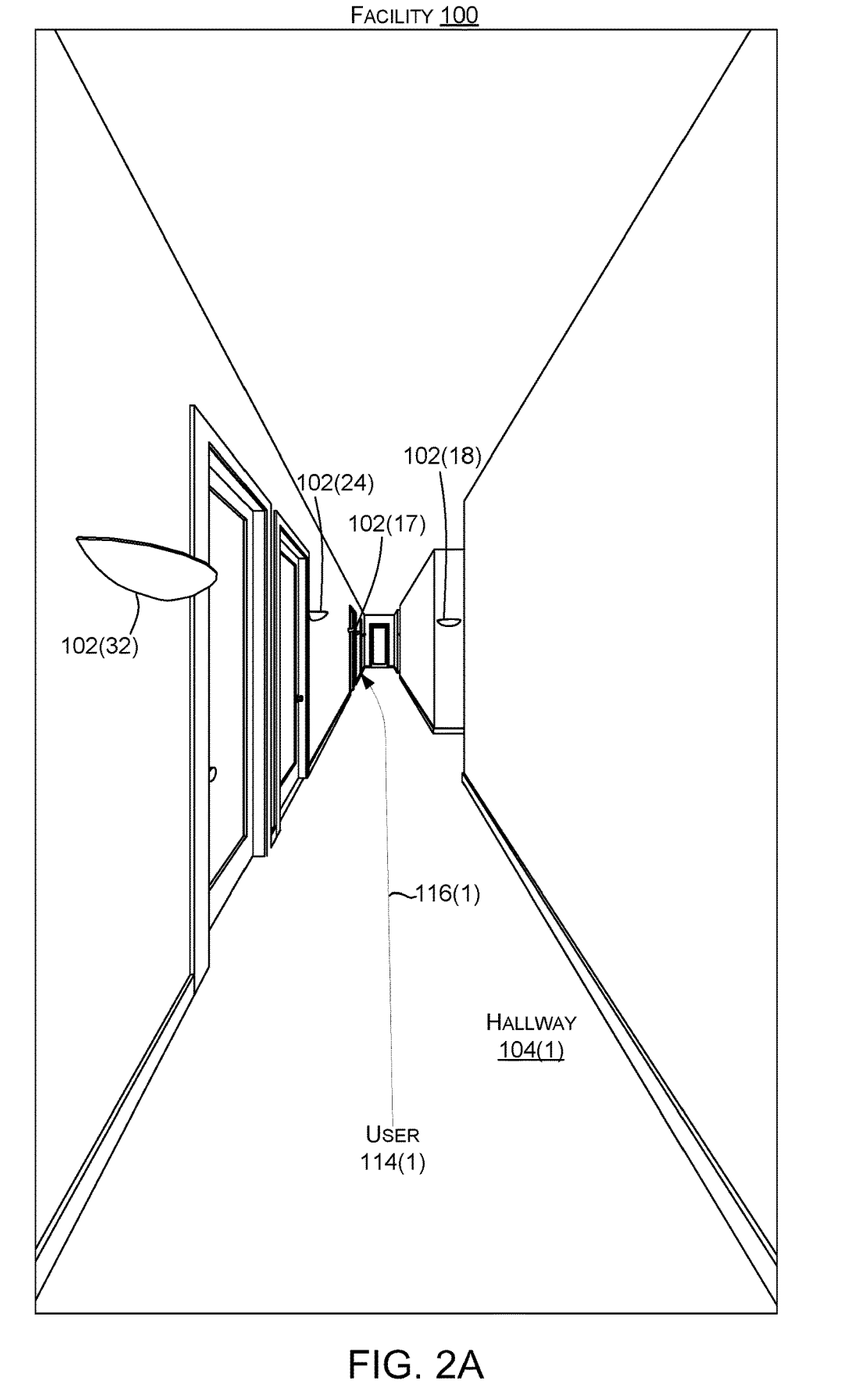
Figure 2B:
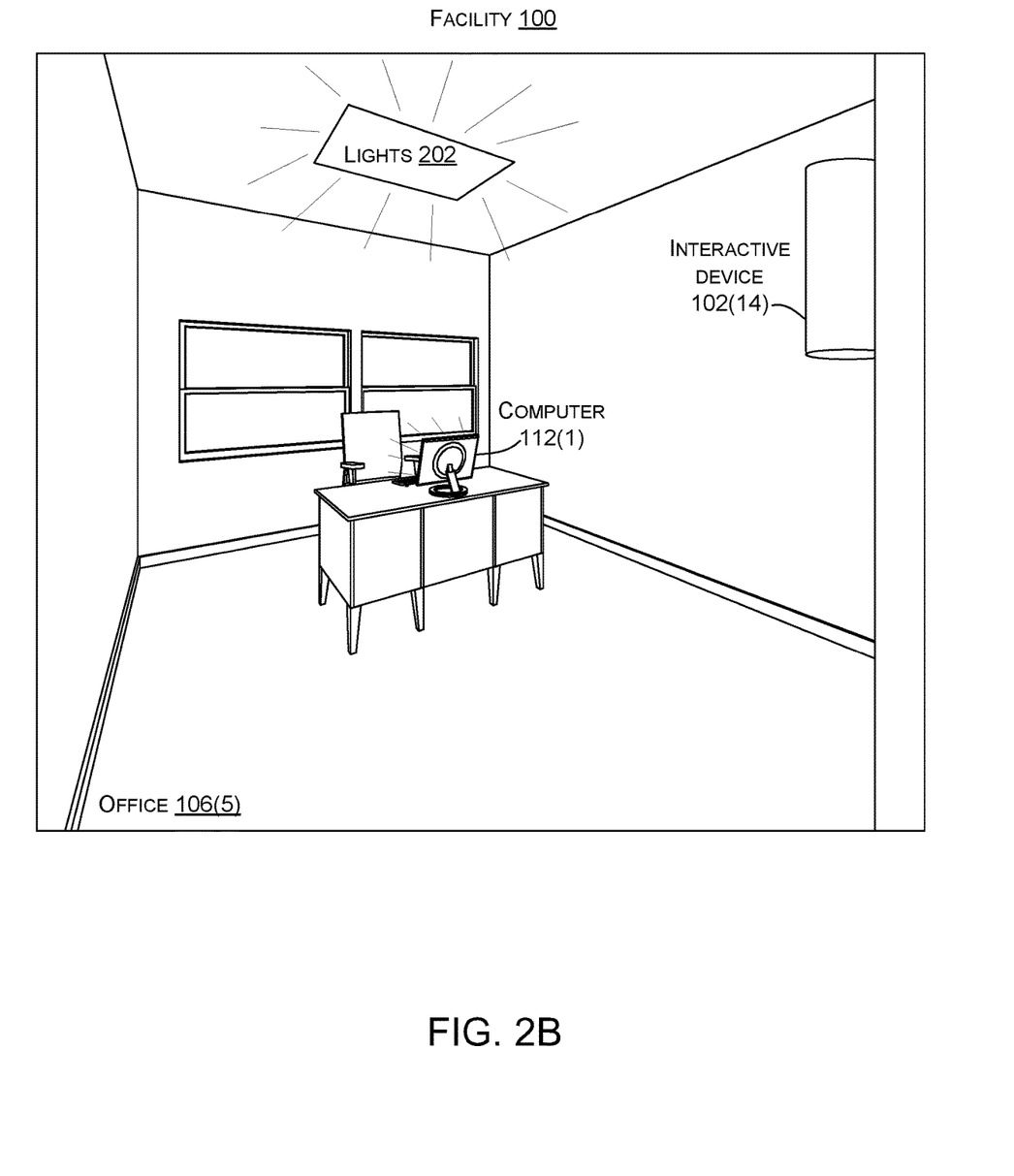

FIGS. 2A and 2B involve a scenario relating to user 114(1). Office 106(5) (FIG. 1) belongs to user 114(1). The user can reach his/her office via path 116(1) introduced in FIG. 1. FIG. 2A is shown from the user's perspective as the user enters hallway 104(1) and starts walking down the hallway toward office (106(5), FIG. 1), which is represented by the fourth door on the left in FIG. 2A. In some cases, as the user enters the hallway 104(1), the user may identify him/herself. For instance, user 114(1) may enter the hallway and say "Hi, this is John Smith." At this point, the interactive devices 102 may attempt to authenticate the user. For example, the interactive devices 102(32), 102(24), 102(18), and/or 102(17) in hallway 104(1) may gather biometric data from 'John Smith' in the hallway in an attempt to authenticate that this person is in fact John Smith. For instance, the voice of 'John Smith' in the hallway may be compared to stored voice data (e.g., voice profile) for John Smith. Other and/or additional biometric parameters such as visible characteristics, such as height, shoulder width, stride length, and/or facial features, among others, may also be used to authenticate the user. Upon authentication, various actions can be automatically taken on the user's behalf. For instance, lights between the user and his/her office may automatically be turned on. Other examples are described relative to FIG. 2B.

FIG. 2B shows a view from the perspective of the authenticated user 114(1) as he approaches his office. In this case, upon authentication, various actions can be automatically taken on the user's behalf. In this example, lights 202 in the office can be turned on. Similarly, the user's computer 112(1) can be turned on so that it wakes-up or otherwise achieves an active state (represented by 'light rays' emanating from the computer in FIG. 2B) before the user reaches the office. In some configurations, some of the interactive devices 102 can communicate with the user's computer and login the user (e.g. authenticate the user) based upon the authentication performed on the user in the hallway. Thus, the computer 112(1) can be ready to use as soon as the user enters the office 106(5) without any affirmative action on the user's part.

Further, in some configurations the interactive devices 102 can examine the user 114(1)'s calendar and determine if the user has any upcoming events. For instance, the user may be scheduled to participate in a video call at the time the user is walking down the hall. The interactive devices 102 can cause the video call to be initiated on the computer 112(1) so that it is ready when the user enters.

As mentioned above, the spatial mesh 110 of interactive devices 102 can provide progressive authentication of the user 114(1). For instance, in one example, the user may have been authenticated at an adjacent facility. For example, assume that the user presented a smart card, password, and/or retinal scan at a security checkpoint in the adjacent facility and was authenticated as John Smith. Interactive devices at the adjacent facility could track John Smith as he left the other facility walking toward facility 100. The information from the other facility could be conveyed to the interactive devices 102 of facility 100. If the user then enters the facility, the interactive devices can identify how long the user took to get to the facility 100 and can sense biometric data from the user and compare the sensed biometric data to biometric data from the authenticated user obtained in the adjacent facility. If the biometric data matches and the elapsed time is reasonable, then the user can be authenticated by interactive devices 102, such as interactive devices 102(32), 102(18), 102(24) and/or 102(17) in facility 100. For instance, if the elapsed time is five minutes and the facilities are one hundred yards apart, the elapsed time is reasonable, whereas if the facilities are one hundred miles apart, the user in the facility cannot be the same user. Stated another way, the interactive devices can track the user and compare the last known location, intended destination, and/or elapsed time, etc. to ensure the authenticity of the use.

Once authenticated in facility 100, the progressive authentication of the user 114(1) can be ongoing. For instance, the interactive devices 102 can continue to gather information from the user. For example, the interactive devices may indicate that the user went down the hall into his office 106(5) and is still in his office. If at such a time, another user enters the facility 100 and identifies himself as John Smith, the interactive devices 102 can indicate that the new user cannot be John Smith and may be a nefarious imposter.

In the scenario mentioned above, the user 114(1) self-identified by voice. In an alternative scenario, when the user enters the hallway 104(1), interactive devices 102 proximate to the user, such as interactive device 102(32) can automatically attempt to identify the user without any affirmative action on the part of the user. For instance, the interactive devices may sense various biometric parameters about the user. The sensed biometric parameters can be compared to biometric parameters of known users to identify the user. Further, information about the user can be passed from interactive device to interactive device as the user proceeds down the hallway. For instance, interactive device 102(32) can pass biometric information that it sensed to interactive devices 102(24) and 102(18), which in turn can sense additional information and pass all of the information to interactive device 102(17). This configuration can allow collective identification of the user. For instance, interactive device 102(32) may initially identify the user with a forty percent confidence. This information can be passed to interactive devices 102(24) and 102(18), which may sense additional data about the user. This additional data may allow the confidence to be increased to 80 percent, for example. In such a case, as the confidence level increases, the process can transition from identification to authentication. For instance, initial biometric data from the user may indicate a match with stored biometric information from 'John Smith.' When the confidence level in the match between the stored biometric information and the sensed biometric data exceeds a confidence threshold, such as ninety-nine percent, then the user can be authenticated as John Smith.

Figure 3A:
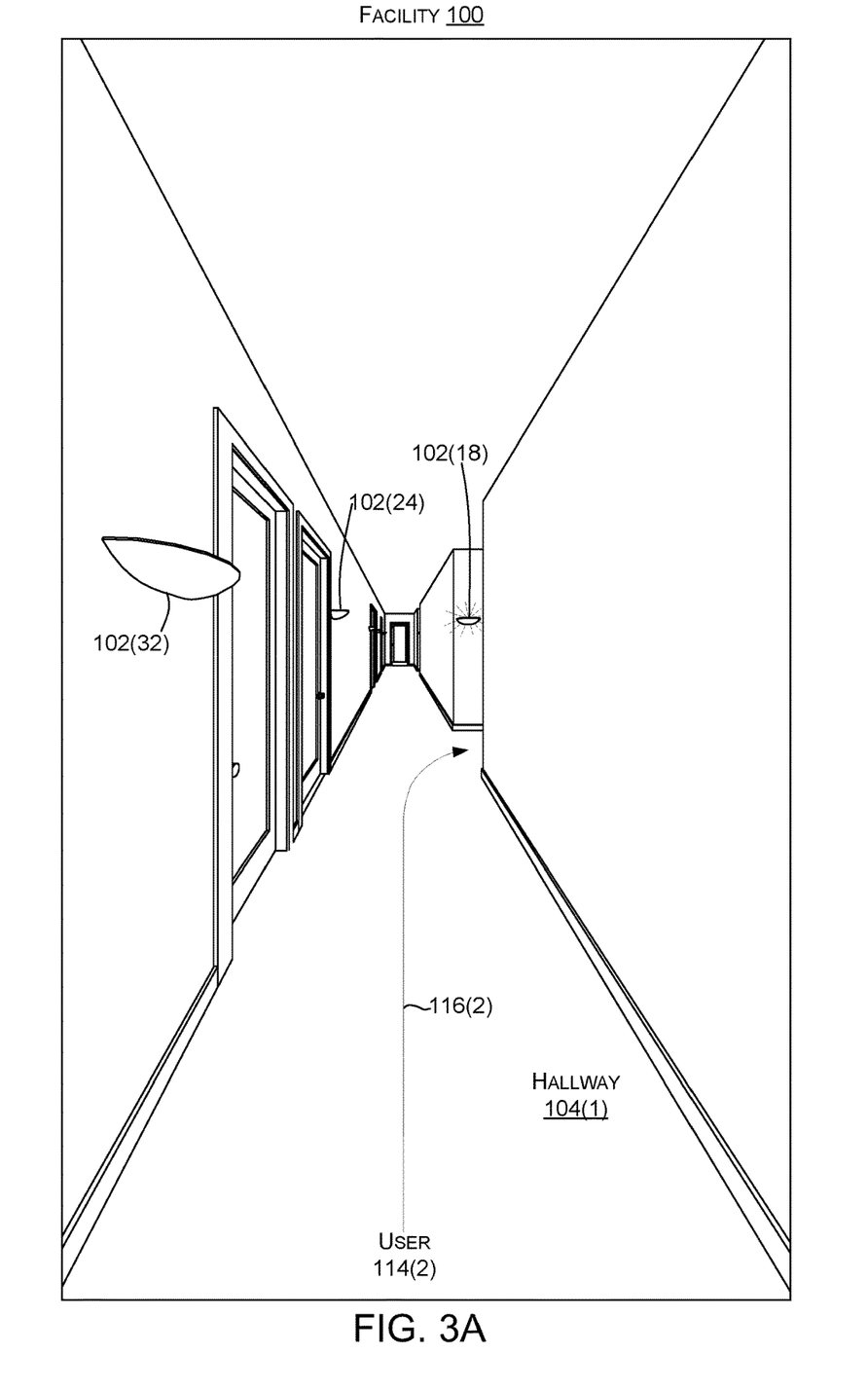
Figure 3B:
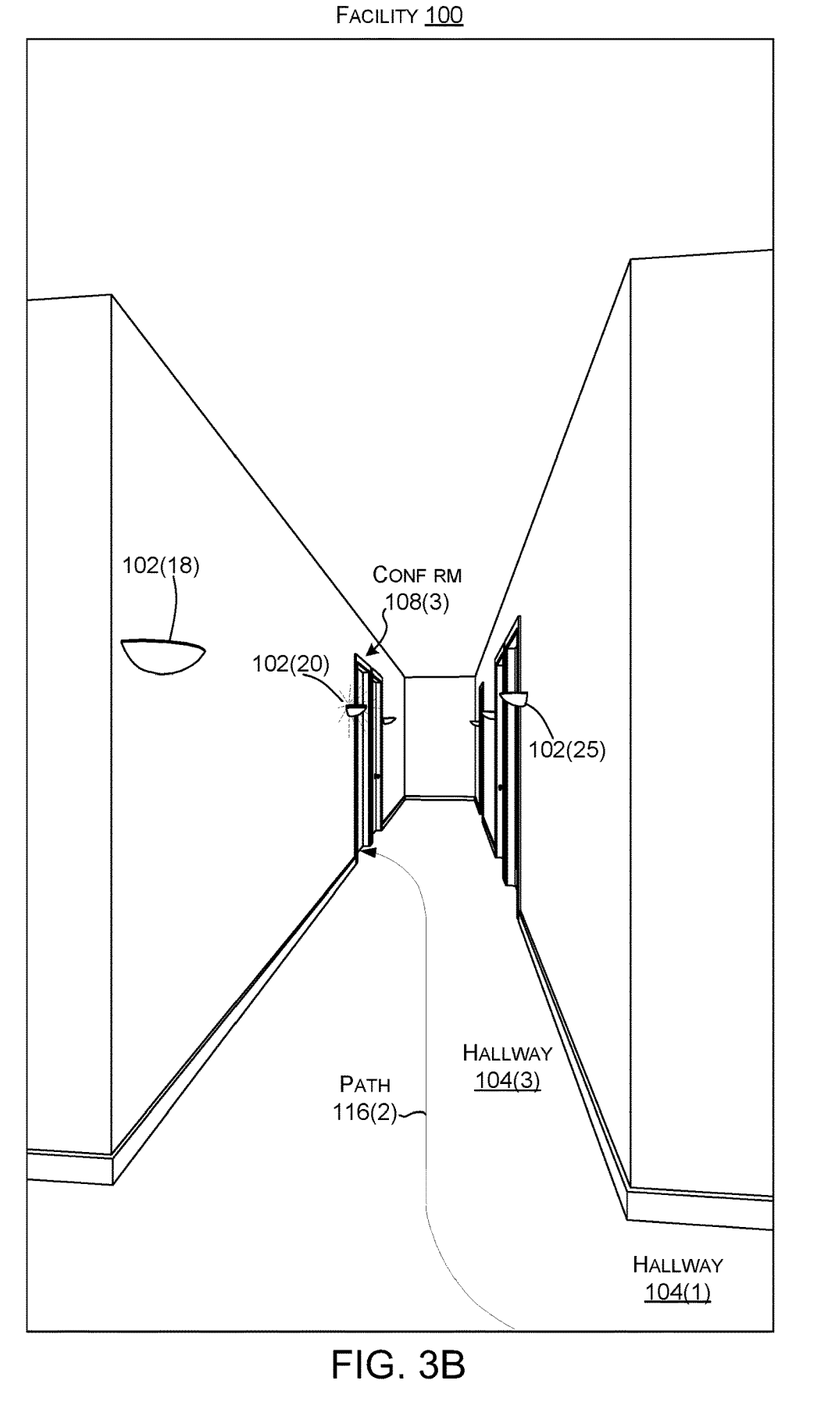

FIGS. 3A-3B involve a second user 114(2) (Jane Doe) who has come to the facility 100 to attend a meeting in conference room 108(3) with John Smith. In this case, the user may identify herself to interactive device 102(32) as she enters hallway 104(1). Alternatively or additionally, interactive device 102(32) may communicate with the user's smart phone (112(2), FIG. 1). For instance, the interactive device may communicate with the smart phone via Bluetooth or Wi-Fi, among others. The interactive device can obtain information about the user from the smart phone, such as the user's name, 'user name,' etc. In some configurations, the interactive device may also obtain authentication information from the smart phone. For instance, if the user is logged into accounts on the smart phone that require verification, such as passwords, the interactive device may use this information to authenticate the user. This authentication may be accepted as a standalone authentication or may be confirmed with other parameters, such as a comparison of biometric parameters sensed from the user and stored biometric parameters associated with the user.

Once the user is identified, interactive device 102(32) can check a facility scheduling application and can determine that Jane Doe has a meeting in conference room 108(3). In this case, the interactive devices 102 can guide the user to the conference room. In this example, individual interactive devices can guide the user along path 116(2) to conference room 108(3). For instance, the interactive devices can provide audio and/or visual guidance to the user. For example, if the scheduling information indicates that Jane Doe is visually impaired, then the interactive devices could provide audible instructions. For instance, interactive device 102(18) could provide audible instructions for the user to walk toward the sound. Interactive devices 102(24) and/or 102(18) could sense when the user has reached hallway 104(3) and instruct the user to turn right.

If the user 114 is not visually impaired, the interactive devices 102 can provide a combination of audio and visual guidance. For instance, interactive device 102(32) may instruct the user to follow a particular color or pattern of light (e.g., a visual cue). For example, user 114(2) could be instructed to follow the purple lights to one destination while another user is instructed to follow the green lights to a second destination. Alternatively, a fast blinking light could guide user 114(2) while a slow blinking light could guide another user. In this example, assume that user Jane Doe is instructed to follow the purple light. Interactive device 102(18) can emit purple light (represented as dashed lines emitted from interactive device 102(18)) until the Jane Doe reaches and turns into hallway 104(3).

At this point, as shown in FIG. 3B, Jane Doe can now see purple light (dashed lines) from interactive device 102(20) outside conference room 108(3). Jane Doe can follow the purple light to the conference room and enter the conference room. Upon entering the conference room, the interactive devices can stop emitting the purple light. Interactive devices 102(32), 102(18), 102(25), and/or 102(20) can track Jane Doe's progression and indicate to interactive device 102(19) that she is entering the conference room 108(3). Interactive device 102(19) can then confirm that Jane Doe is in the conference room. Note that in the illustrated configuration of FIG. 1 in combination with FIGS. 3A and 3B, the interactive devices 102 can provide continuous tracking of the user 114(2) within the facility 100. For instance, as the user enters hallway 104(1) interactive devices 102(32), 102(24), and/or 102(18) can sense the user through light and/or sound, among other ways. As the user turns into hallway 104(3) and is no longer visible to interactive device 102(32), the user is detected by interactive devices 102(25) and/or 102(20) and is still detectable by interactive device 102(18). Information from interactive device 102(32) can be communicated to interactive devices 102(25) and 102(20). As the user enters conference room 108(3), the user is no longer in line of sight for interactive device 102(20), but is in line of sight of interactive device 102(27) while the user is detected by interactive device 102(19) in the conference room. Thus, the user can be continually detected by at least one device and 'handed off' to additional interactive devices as the user progresses through the facility. Further, in instances where coverage gaps exist, temporal and/or audio information can be used to ensure continuity. For instance, assume that hallway 104(3) only contained interactive device 102(20) and this interactive device tracked the user down the hallway and confirmed there was only one user in the hallway. When the user enters the conference a short duration later (for example one second later) and is detected by interactive device 102(19), the interactive devices can utilize their shared information about the user including the short elapsed time to confirm that the user entering the conference room is the same user that was tracked down the hallway.

Upon confirming that Jane Doe is in the conference room 108(3), interactive device 102(19) can send a notice to John Smith on his computer 112(1) that it is time to join the meeting. Interactive device 102(19) can alternatively or additionally, automatically start presentation material when John Smith arrives in the conference room.

Further, the interactive device 102(19) can sense whether the conference room 108(3) door is closed or open. The interactive device 102(19) may only present sensitive materials when the door is closed and/or may stop the presentation if the door is opened. Thus, whether the door is opened or closed is an example of a parameter that the interactive devices can use to control access to sensitive materials. In another example, interactive device 102(19) may determine the number of people in the conference room and their identities. If the number is greater than the number on the invitation for the meeting, the interactive device may limit access to sensitive materials in the conference room (e.g., security management). Similarly, if someone in the conference room does not have permission/clearance for specific materials, those materials may be protected by the interactive devices. Thus, these implementations can provide both data security and user privacy.

Note also, that the meshed interactive devices 102 can provide additional conveniences to the users 114. For instance, assume that John Smith and Jane Doe don't finish their meeting in the scheduled time and the attendees for the next scheduled meeting want to get into conference room 108(3). John and Jane can simply ask interactive device 102(19) to find an available conference room. The mesh 110 of interactive devices knows which conference rooms are occupied (via sensing) and can access the conference room scheduling application. From this information, interactive device 102(19) can provide John and Jane a listing of conference rooms that are both open (e.g., unscheduled) and unoccupied. Further, the interactive device can schedule one of the available rooms for them and the interactive devices can guide them to the new room.

Figure 4:
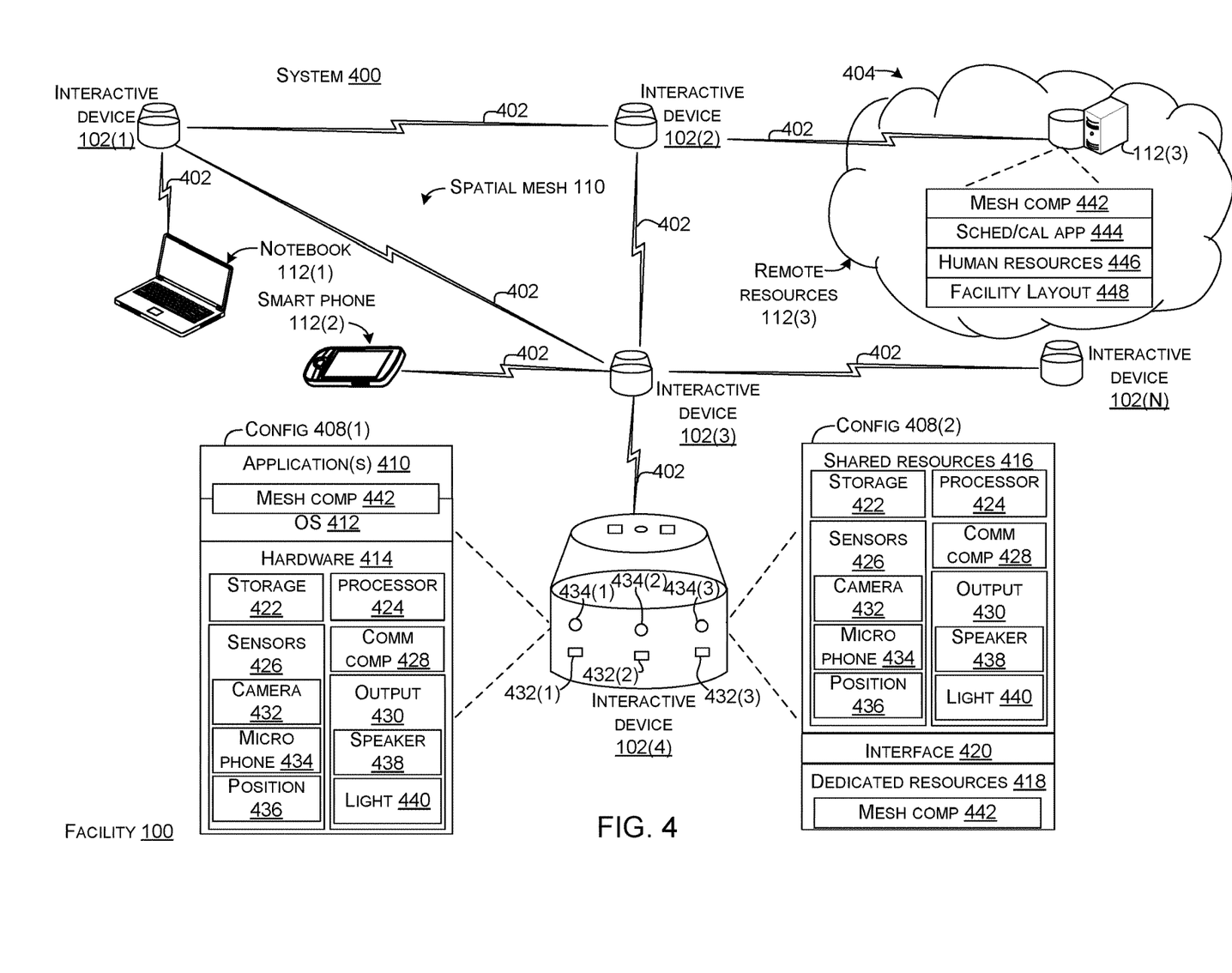
FIG. 4 shows an example system of spatially meshed interactive devices in accordance with some implementations of the present concepts.

FIG. 4 illustrates an example interactive device system 400. In this case, five interactive devices 102(1)-102(N) are illustrated in a spatial mesh 110 in facility 100. (As used here "N" represents the largest number of interactive devices in the mesh, though the number of devices can vary among implementations. For instance, the illustrated implementation employs five interactive devices, while another implementation may employ hundreds). In the spatial mesh 110, each interactive device 102 can be communicatively coupled to at least one other interactive device 102, such as via a network(s) 402. Individual interactive devices can also be coupled to other devices 112. For instance, in this case, interactive device 102(1) is coupled to notebook computing device 112(1) and interactive device 102(3) is coupled to smart phone device 112(2). (FIG. 4 represents a snapshot in time and relative positions and coupling may change over time. For instance, user 114 may carry smart phone device 112(2) as he/she travels through the facility 100. As such, the smart phone device 112(2) may uncouple from interactive device 102(3) and couple with interactive device 102(2), for instance.) In the illustrated system, interactive device 102(2) is coupled to server device 112(3). The server device can be viewed as an example of remote resources 404 that can be accessed by the interactive devices 102 over network 402.

Individual interactive devices 102 can be manifest as one of two illustrated configurations 408(1) and 408(2), among others. Briefly, configuration 408(1) represents an operating system centric configuration and configuration 408(2) represents a system on a chip configuration. Configuration 408(1) is organized into one or more applications 410, operating system 412, and hardware 414. Configuration 408(2) is organized into shared resources 416, dedicated resources 418, and an interface 420 there between.

In either configuration, the interactive devices 102 can include storage 422, a processor 424, sensors 426, a communication component 428, and/or an output component 430. The sensors 426 can include various types of sensors, such as a camera 432, a microphone 434, and/or positional sensor 436, such as inertial measurement units (IMUs), gyroscopes, accelerometers, and/or radar devices, among others. The output component 430 can include a speaker 438 and/or a light 440. The light can be implemented as directional lights (e.g., only visible from specific directions), standard lights (e.g., diffuse and visible from multiple directions), and/or displays (e.g., touch or non-touch enabled), among others. The interactive devices 102 can also include a mesh component 442. Individual interactive devices can alternatively or additionally include other elements, such as buses, graphics cards (e.g., graphics processing units (GPUs)), etc., which are not illustrated or discussed here for sake of brevity.

The communication component 428 can allow individual interactive devices 102 to communicate with one another utilizing various techniques. The communication component can include a receiver and a transmitter and/or other radio frequency circuitry for communicating with various technologies, such as cellular, Wi-Fi (IEEE 802.xx), Bluetooth, etc.

The camera 432 can be manifest as a 2-D, 3-D camera, visible light camera, and/or non-visible light camera. In the illustrated configuration, camera 432 is implemented as an array of cameras 432(1)-432(3) that can work cooperatively to provide depth information (e.g., function as a 3-D camera). Thus, the cameras can sense their environment (e.g., room) and generate a 3-D model of the room and of any users 114 present in the room. Further, the cameras can detect user features, such as facial features, arm length, etc, that can be analyzed as biometric parameters. Similarly, microphone 434 is implemented as an array of microphones 434(1)-434(3) that can operate cooperatively to determine direction and movement of users based on their voice and/or sounds they make. Alternatively or additionally to 3-D modeling with the cameras, the microphone array can create a 3-D model of the room and its occupants. The 3-D model generated by the sensors 426 of an individual interactive device can be shared with adjacent interactive devices to create a spatially meshed 3-D model of the facility 100 and its occupants.

The remote resources 404 can include an instance of the mesh component 442. The remote resources can also include aspects relating to the facility 100, such as scheduling/ calendaring application 444, human resources information 446, and/or facility layout information 448, among others.

The human resources information 446 could include which employees work in the facility and their associated office room number, and/or which employees are authorized to access the building. Other types of human resources information can include organizational charts and/or employee security clearances, among others. The facility layout information 448 can include facility blue prints and/or lighting schematics, among others.

The mesh component 442 can coordinate various functions. For instance, the mesh component can relate information about the interactive devices 102, such as their absolute and/or relative location. For instance, the absolute location (e.g., GPS coordinates) of some interactive devices can be known. The location of other interactive devices can be known relative to the absolute location. Thus, the mesh component can map absolute and/or relative locations of individual interactive devices to facility layout information 448. For instance, relative to the facility 100 of FIG. 1, the mesh component may map the GPS coordinates of interactive device 102(1) to the fact that interactive device 102(1) is inside office 106(1), and that outside the office is hallway 104(1), and that interactive device 102(2) is located in the hallway six inches from interactive device 102(1), etc. The mesh component may also map to whom (e.g., which user) office 106(1) is assigned based upon the human resources information 446.

As mentioned above, the interactive devices 102 can include various sensors 426 such as optical, audio, and/or other signal transducers with spatial sensitivity. In some implementations, individual interactive devices can be positioned in the spatial mesh 110 in locations selected so that each interactive device 102 can be sensed by at least one other interactive device. For instance, each interactive device could emit a pulsing infrared (IR) beacon from its light 440 (or a different imperceptible source) and utilize the camera array 432(1)-432(3) to estimate the position of other such sources, such as with a combination of angle and intensity. Since in some implementations the interactive devices 102 are mounted in permanent positions, readings can be taken over time, so that the accuracy can be improved over instant measurements. Since the interactive devices can be coupled to remote resources (e.g., connected to the mesh component 442 in the cloud), algorithms to improve spatial accuracy can be distributed as needed. For instance, algorithms may be refined long after installation to adjust for changes in humidity, as reported by other sensors in the facility environment. The refined algorithms can be sent to the interactive devices 102 via networks 104.

In implementations where the interactive devices 102 include cameras 432, machine vision techniques can be used to correlate what each camera sees with previously gathered images in the space in order to estimate the interactive device's position.

Similarly, imperceptible ultrasonic beacons can be emitted from the speakers 438. For instance, microphone array 434(1)-434(3) can then estimate the direction of origin and intensity, and the spatial mesh 110 can be improved over time as mentioned above.

Interactive devices 102, via their communication component 428, can measure changes in the intensity of mobile device signals carried by people (e.g., users 114) in the facility 100 and cross reference them. For instance, if one interactive device tracks a device such as smart phone 112(2) as it is carried past, when the next interactive device down the hallway 104 encounters the same device, there can be a smooth tradeoff, in which the fall of the signal to the first interactive device can be correlated with the rise in the signal to the next interactive device. While this correlation does not guarantee spatial accuracy, it does create a usably persistent reference framework that can be applied in some of the applications mentioned above and/or below.

Interactive devices 102 can monitor the relative intensity of Wi-Fi antennas in known locations over time. As long as each interactive device 102 can sense multiple (such as four) Wi-Fi antennas, then a spatial representation of the interactive device 102 locations becomes possible. Note that this technique can be dependent on a large number of samples over an extended period of time, since Wi-Fi intensity tends to vary for many reasons. Furthermore, it may only provide an economy if there are substantially fewer Wi-Fi antennas than interactive devices 102, since the locations of the Wi-Fi devices would have to be determined and recorded.

As mentioned above, in some implementations, interactive devices 102 can include IMUs and be unboxed (e.g., set-up) in a single known location when first installed. The IMUs of the spatial mesh 110 of interactive devices can provide a spatial estimate based on the record of motion prior to initial installation and can provide an initial estimate of position that will make the above methods feasible.

In an alternative configuration the interactive devices 102 may be installed with the aid of an installer device that includes a base element and a holder or cradle element. Initially, the base and the holder can be positioned together. The base element can include precise absolute positioning capability (e.g., GPS) and be positioned relative to the facility where it can receive adequate GPS signals to determine its location. For instance, the base can be positioned outside the facility or inside by a window. The holder can include precise relative position capabilities. An interactive device can be positioned in a known physical relationship to the holder (e.g., in the holder). The base can establish the absolute location, and the holder can be removed from the base and moved to a desired location for the interactive device. The holder can ascertain its location relative to the base, and this relative and absolute location information can be provided to, or otherwise associated with, the interactive device, which can be removed from the holder at the location. This process can be repeated to position the interactive devices throughout the facility. This configuration can allow the interactive devices to leverage the installer device and thus to have fewer and/or less costly positioning components, and thus the interactive devices can be less expensive.

Note that the interactive devices 102 in the facility 100 may be identical, or they may have different capabilities. For instance, some may be more robust than others. For example, some may only have capabilities to communicate with other interactive devices while others may also be able to communicate with the remote resources 112(3). Similarly, the mesh components 442 on individual interactive devices and/or on remote resources 112(3) may have the same capabilities and/or may have different capabilities. Even in an instance where the mesh components 442 have the same capabilities, some mesh components may perform more functionality while others provide lesser functionality. For instance, the mesh component 442 on the remote resources may interact with the scheduling application 444, human resources information 446, and/or facility layout information 448 and provide this information to the mesh components on the individual interactive devices 102 at the facility 100.

From one perspective, any of interactive devices 102 and/or devices 112 can be thought of as computers. The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 408(2) can be thought of as a system on a chip (SOC) type design. In such a case, functionality provided by the device can be integrated on a single SOC or multiple coupled SOCs. One or more processors can be configured to coordinate with shared resources 416, such as memory, storage, etc., and/or one or more dedicated resources 418, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

EXAMPLE METHODS

Figure 5:
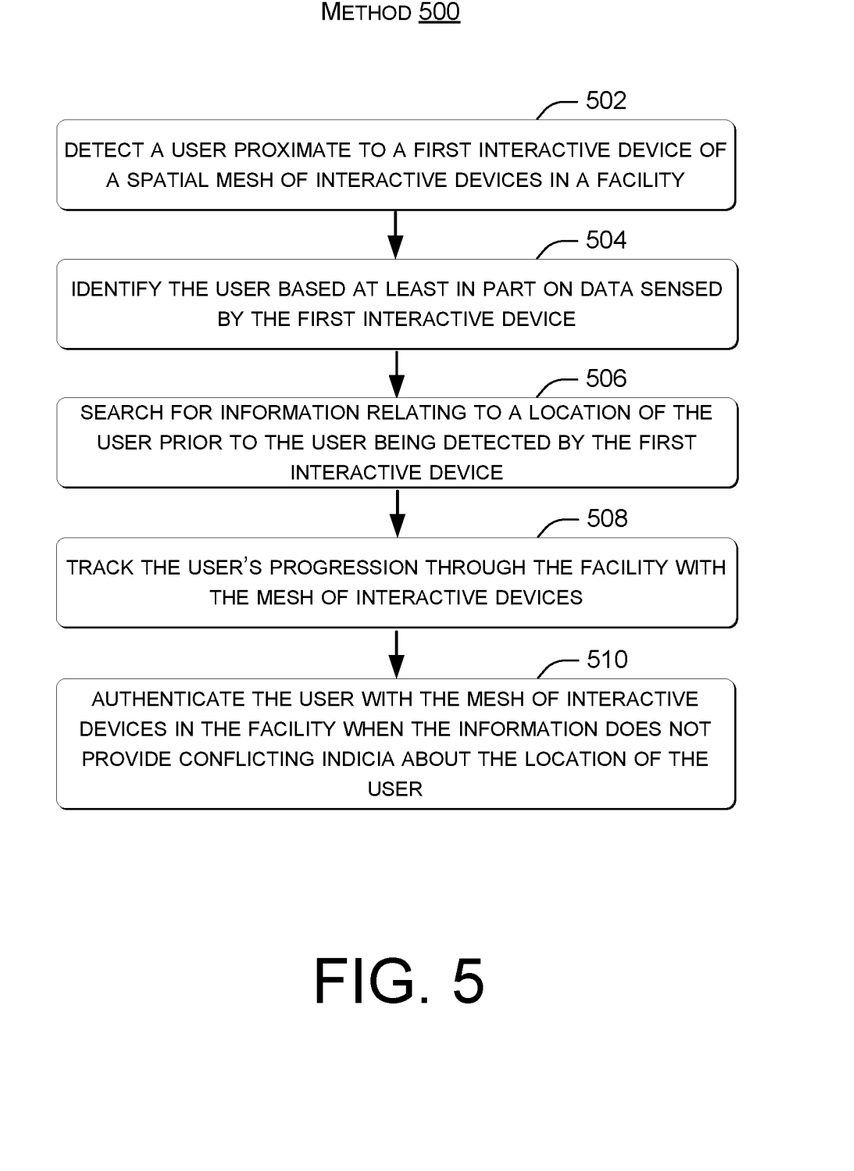
FIG. 5 shows a flowchart of an example method that can implement some of the present concepts in accordance with some implementations.

FIG. 5 illustrates a flowchart of a technique or method 500 relating to spatial meshes of interactive devices.

At block 502, the method can detect a user proximate to a first interactive device of a spatial mesh of interactive devices in a facility.

At block 504, the method can identify the user based at least in part on data sensed by the first interactive device.

At block 506, the method can search for information relating to a location of the user prior to the user being detected by the first interactive device.

At block 508, the method can track the user's progression through the facility with the spatial mesh of interactive devices.

At block 510, the method can authenticate the user with the spatial mesh of interactive devices in the facility when the information does not provide conflicting indicia about the location of the user.

As mentioned above, some scenarios can start with the user speaking to the interactive device and self-identifying. Initial authentication might take place through a multifactor regimen, such as calling the person's mobile phone, obtaining fingerprints, and/or sensing the user's face and performing facial recognition, among others.

Thereafter, the user would agree to be tracked within the facility and/or multiple facilities, such as those associated with an enterprise or other entity. The tracking process can include privacy protections. For instance, data would be wiped when the person leaves the building, and could only be accessed by the progressive authentication algorithm.

In configurations where the interactive devices include cameras, the person can be tracked through gait and/or facial recognition, among others. In audio-only configurations, the user can be tracked through footsteps and/or through self-announce and voice recognition, among others.

If a person/user has been tracked continuously since entering the facility and successfully completed a multifactor authentication, then the person can merely sit in front of a device, such as a computer, and can be immediately granted access.

The interactive devices can also provide navigation to the user. Large enterprises tend to have large facilities, and often have a problem with people/users being late to meetings because it's hard to find the correct conference room. The interactive devices can provide audio instructions and/or visual guidance or cues to the user. For instance, the interactive device could speak. "Jane Doe, please go to the end of this hallway and then turn right."

An alternative or complementary configuration can employ lights, such as variable color lights to provide guidance. For instance, the user might say, "Please guide me to the room where my next meeting is scheduled." The interactive device could respond, "Sure, please follow the purple light."

The user could then be tracked as mentioned above. The user would follow the purple light, and ignore other colors. When the user comes to a choice of hallways, only one would have an interactive device showing a purple light, and the user would follow that one. The interactive devices of the spatial mesh could have a record stating if the user is color blind and would only choose colors that would work for that user. A scheduling algorithm could maximize the throughput of people for a given number of colors.

The spatial mesh of interactive devices can also aid users in accessing proprietary enterprise information that is more easily requested and conveyed by voice. For instance, a user is about to leave his/her office for a meeting. The user can request, "Who is the manager of the person I am about to meet?"

To answer, the spatial mesh of interactive devices can access both the user's calendar and the organizational chart. This is distinct from the more familiar use of voice interfaces to query search engines, because it must involve permissions and authentication, such as through the progressive authentication method described above.

The spatial mesh of interactive devices can also facilitate voice calls within the enterprise. Enterprises that desire extra levels of security might not be comfortable with users calling each other on mobile phones that send voice data through an external network. At the same time, it may be inconvenient to ask people to always use a VOIP app or to get to a computer to make a call within the organization. If there is a sufficiently dense distribution of interactive devices in a facility, a user can simply find a private spot and ask to be connected with someone else.

In some implementations the spatial mesh of interactive devices can provide location context to natural language interaction. For instance, if a user says, "Turn up the lights," the interactive devices will know in which location to do so. Another example can include the command, "Print this on the closest printer." Still another example can entail the command, "Tell my team to meet at three in the closest room to me with conferencing capabilities, or the closest, on average, to where everyone else is scheduled to be."

The spatial mesh of interactive devices can also provide validation of privacy. For instance, in the event that someone wishes to have a private conversation, the spatial mesh of interactive devices can keep track of whether any other individual is close enough to listen in.

The described methods can be performed by the systems and/or elements described above and/or below, and/or by other interactive devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Additional Examples

Various device examples are described above. Additional examples are described below. One example includes at least one computer-readable storage medium having instructions stored thereon that, when executed by a computing device, cause the computing device to perform acts. These acts comprise detecting a user proximate to a first interactive device of a spatial mesh of interactive devices in a facility and identifying the user based at least in part on data sensed by the first interactive device. The acts further comprise searching for information relating to a location of the user prior to the user being detected by the first interactive device, tracking a progression of the user through the facility with the spatial mesh of interactive devices, and authenticating the user with the spatial mesh of interactive devices in the facility when the information does not provide conflicting indicia about the location of the user.

Another example can include any of the above and/or below examples where the detecting comprises detecting voice data of the user and the identifying comprises comparing the voice data to voice profiles of known users.

Another example can include any of the above and/or below examples where the detecting comprises detecting visible characteristics of the user and the identifying comprises comparing the visible characteristics to visible characteristics of known users.

Another example can include any of the above and/or below examples where the searching for information comprises searching for a last known location of the user prior to the detecting.

Another example can include any of the above and/or below examples where the authenticating comprises considering a distance from the last known location to the facility and an elapsed time since the last known location.

Another example can include any of the above and/or below examples where the tracking comprises the first interactive device sending user information to an adjacent interactive device that the user is traveling toward.

Another example can include any of the above and/or below examples where the at least one computer-readable storage medium having instructions stored thereon that, when executed by a computing device, cause the computing device to perform acts further comprising determining an intended destination of the user in the facility.

Another example can include any of the above and/or below examples where the at least one computer-readable storage medium having instructions stored thereon that, when executed by a computing device, cause the computing device to perform acts further comprising guiding the user to the intended destination.

Another example can include any of the above and/or below examples where the guiding comprises providing visual cues.

Another example can include any of the above and/or below examples where the guiding comprises providing audio instructions.

Another example can include any of the above and/or below examples where the guiding comprises providing audio instructions and visual cues.

Another example can include a method comprising positioning an interactive device in a known physical relationship with an installer device that has capabilities to determine an absolute location of the installer device. The method further comprises moving the interactive device and the installer device to a desired location for the interactive device within a facility, defining the desired location relative to the absolute location, communicatively coupling the interactive device to other interactive devices within the facility, and providing relative locations of the other interactive devices to the interactive device to create a spatial mesh of interactive devices at the facility.

Another example can include any of the above and/or below examples where the positioning comprises positioning the interactive device in a holder of the installer device.

Another example can include any of the above and/or below examples where the moving comprises separating the holder of the installer device from a base of the installer device and moving the holder and the interactive device to the desired location.

Another example can include a system comprising a mesh component that has access to a layout of features of a facility and to information about users associated with the facility. The system further comprises multiple interactive devices including sensors and communication components, the multiple interactive devices communicatively coupled via the communication components and at least some of the multiple interactive devices communicatively coupled to the mesh component, the multiple interactive devices located at known positions in the facility that are correlated to the features. The system further comprises individual interactive devices being contextually aware of the positions relative to the features of the facility, individual interactive devices configured to sense a user proximate to an individual feature, individual interactive devices configured to determine an identity of the user based at least partly upon data from the sensors, individual interactive devices configured to convey the identity and the location of the user to other individual devices, and individual interactive devices configured to perform an action for the user based upon the identity of the user, the location of the user, and the information.

Another example can include any of the above and/or below examples where all of the multiple interactive devices are directly communicatively coupled.

Another example can include any of the above and/or below examples where adjacent interactive devices of the multiple interactive devices are directly communicatively coupled.

Another example can include any of the above and/or below examples where each interactive device includes an instance of the mesh component.

Another example can include any of the above and/or below examples where the mesh component is remote from the interactive devices.

Another example can include any of the above and/or below examples where each interactive device is visible to at least one other interactive device.

CONCLUSION

Although the subject matter relating to spatially meshed interactive devices has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one computer-readable storage medium having instructions stored thereon that, when executed by a computing device, cause the computing device to perform acts, the acts comprising:
    detecting a user proximate to a first interactive device of a spatial mesh of interactive devices in a facility;
    identifying the user based at least in part on data sensed by the first interactive device;
    searching for information relating to a previously-known location of the user prior to the detecting;
    tracking a progression of the user through the facility with the spatial mesh of interactive devices; and,
    authenticating the user with the spatial mesh of interactive devices in the facility when the information does not provide conflicting indicia about the previously-known location of the user.

2. The at least one computer-readable storage medium of claim 1, wherein the detecting comprises detecting voice data of the user and the identifying comprises comparing the voice data to voice profiles of known users.

3. The at least one computer-readable storage medium of claim 1, wherein the detecting comprises detecting visible characteristics of the user and the identifying comprises comparing the visible characteristics to visible characteristics of known users.

4. The at least one computer-readable storage medium of claim 1, wherein the previously-known location comprises a last known location of the user and the authenticating comprises considering a distance from the last known location to the facility and an elapsed time since the last known location.

5. The at least one computer-readable storage medium of claim 1, wherein the tracking comprises the first interactive device sending user information to an adjacent interactive device that the user is traveling toward.

6. The at least one computer-readable storage medium of claim 1, the acts further comprising determining an intended destination of the user in the facility.

7. The at least one computer-readable storage medium of claim 6, the acts further comprising guiding the user to the intended destination.

8. The at least one computer-readable storage medium of claim 7, wherein the guiding comprises providing visual cues.

9. The at least one computer-readable storage medium of claim 7, wherein the guiding comprises providing audio instructions.

10. The at least one computer-readable storage medium of claim 7, wherein the guiding comprises providing audio instructions and visual cues.

11. A system, comprising:
    a mesh component that has access to a layout of features of a facility and to information about users associated with the facility;
    multiple interactive devices including sensors and communication components, the multiple interactive devices communicatively coupled via the communication components and one or more of the multiple interactive devices communicatively coupled to the mesh component, the multiple interactive devices located at known positions in the facility that are correlated to the features,
    one or more of the interactive devices being contextually aware of the known positions relative to the features of the facility;
    one or more of the interactive devices configured to sense a user proximate to an individual feature;
    one or more of the interactive devices configured to determine an identity of the user based at least partly upon data from the sensors;
    one or more of the interactive devices configured to convey the identity and the location of the user to other individual devices; and,
    one or more of the interactive devices configured to perform an action for the user based at least upon the identity of the user, the location of the user, and the information.

12. The system of claim 11, wherein all of the multiple interactive devices are directly communicatively coupled.

13. The system of claim 11, wherein adjacent interactive devices of the multiple interactive devices are directly communicatively coupled.

14. The system of claim 11, wherein each interactive device includes an instance of the mesh component.

15. The system of claim 11, wherein the mesh component is remote from the interactive devices.

16. The system of claim 11, wherein each interactive device is visible to at least one other interactive device.

17. A method comprising:
    detecting a user proximate to a first interactive device of a spatial mesh of interactive devices in a facility;
    identifying the user based at least in part on data sensed by the first interactive device;
    searching for information relating to a previously-known location of the user prior to the detecting;
    tracking a progression of the user through the facility with the spatial mesh of interactive devices; and,
    authenticating the user with the spatial mesh of interactive devices in the facility when the information does not provide conflicting indicia about the previously-known location of the user.

18. The method of claim 17, further comprising:
using one or more of the interactive devices of the spatial mesh:
  detecting an available conference room; and
  guiding the user to the available conference room.

19. The method of claim 17, further comprising:
using one or more of the interactive devices of the spatial mesh, activating a computer located in an office of the user as the user travels toward the office.

* * * * *